INVENTORS
MEYER SAPOFF
JOHN G. FROEMEL
BY Albert F. Krouman
ATTORNEY

United States Patent Office 3,364,565
Patented Jan. 23, 1968

3,364,565
METHOD OF MAKING A THERMISTOR
Meyer Sapoff, West Orange, and John G. Froemel, Verona, N.J., assignors to Victory Engineering Corporation, Springfield, N.J., a corporation of Delaware
Filed Feb. 10, 1965, Ser. No. 431,510
6 Claims. (Cl. 29—612)

ABSTRACT OF THE DISCLOSURE

A thermistor having an extremely short time response is formed by the method of providing a buffered liquid suspension of metal oxide material having a particle size smaller than one micron in a volatile liquid, spraying the suspension on the ceramic surface of a substrate, drying the suspension to a dry film and thereafter curing the film by heating it to at least the sintering temperature of the metal oxide materials.

---

This invention relates to electrical resistance elements. In particular, this invention relates to improved methods for the manufacture of thin-film resistors of the type which are sensitive to changes in temperature and which are known in the art as "thermistors."

In the manufacture of thermistors it is desirable to provide a structure with a short time response—that is to design the thermistor in such a way that it is capable of being rapidly heated or cooled and is therefore quick to respond to temperature changes by exhibiting its characteristic changes in electrical resistance. One way of achieving this purpose is to make the thermistor in the form of a thin flake.

Previous methods of making flake thermistors have in general proceeded along the lines of making a paste of the appropriate metal oxides in a suitable vehicle, spreading the paste on a flat surface such as a glass optical flat, drying the paste, removing it from the flat, and firing it at an elevated temperature. This method was subject to a number of disadvantages, including the necessity of handling thin, fragile flakes of material, and a tendency for the flakes to curl on firing. The tendency to curl is attributed to a gradient in the composition of the film of paste through the thickness thereof, caused by the tendency of the heavier particles in the paste to concentrate near the bottom of the film.

In the attempt to overcome these difficulties various other methods have been proposed. It has been proposed, for example to minimize the above mentioned gradient by using a mixture of oxides ground to two different sizes so as to increase the packing fraction. This method has distinct advantages, but in and of itself is not a complete answer to the problem.

Another method is to spread the paste directly into a cavity in the block to which it is to be applied and firing it therewith instead of first forming and firing the flake and then cementing it to the block. This method is successful in overcoming some of the above disadvantages, but involves difficulties in controlling the thickness and uniformity of the flake.

Still another method involves forming a more or less fluid paste of the metallic oxides in a thermoplastic binder, dropping it on the surface of a body of water inside a dam to limit the spread of the floating film, picking up the floating material on a perforated ceramic wafer, and firing the paste on the wafer.

This method also possesses some advantages over the older methods, but is difficult to control because the thickness of the eventual flake depends on many factors, including the concentration of oxides in the paste, the viscosity of the vehicle, the size of the drop of paste placed on the water surface, and the area confined within the dam.

It has also been proposed to apply the thermistor material to the substrate material by suspending it in water or other suitable liquid and then spraying the resulting suspension onto the substrate and subsequently drying and firing it. This method has found very little acceptance in the industry, because of certain disadvantages. Chief among these is the difficulty of producing a film of uniform thickness by this technique.

An object of this invention, therefore, is to provide improved methods for the manufacture of flake thermistors.

Another object is to provide a reliable method for making thermistors characterized by extreme thinness and extremely rapid time response.

A further object is to provide a method as aforesaid, which eliminates the necessity of handling fragile flakes.

Still another object is to provide a method which eliminates any tendency for the flake to curl in firing or to spall away from the substrate by reason of composition or density gradients through the thickness of the flake.

Yet another object is to provide a method which provides the convenience of a spray technique, while eliminating the disadvantages normally associated with spraying methods.

A feature of the invention is the use of a suspension of metal oxide material ground to certain critical particle size specifications, as hereinafter more fully defined.

Another feature resides in the use of a substrate having a surface capable of forming an intimate bond with said metal oxide material.

Still another feature resides in the use of controlled and uniform application conditions in the deposit of the metal oxide material on the substrate.

Another feature is the application of the metal oxides to the substrate in the form of a plurality of successive layers.

Another feature still resides in the step of drying the deposited metal oxide material as a distinct step prior to the firing step.

A further feature is the use of a suspension of thermistor oxide material in a volatile suspending medium.

Another feature is the step of spraying a suspension of thermistor oxide material onto a heated substrate.

Other objects, features and advantages of the invention will become apparent from the following more complete description and claims.

The invention consists in the selection and arrangement of operating steps, as hereinafter more fully described.

In one particularly desirable embodiment, this invention contemplates a method for making an electrical resistance element which comprises in combination the steps of providing a liquid suspension of metal oxide material, at least a substantial proportion of said metal oxide material having a particle size smaller than one micron, said liquid suspension being a suspension in a substantially completely volatile liquid suspending medium, spraying said suspension onto a substrate having a ceramic surface, drying said sprayed-on suspension to form a substantially dry film, and curing said film by heating said film and said substrate to a temperature at least equal to the sintering point of said metal oxide material.

Referring now to the figures, in which elements appearing in more than one view have been given the same reference numeral throughout:

The starting material for the method of this invention is a material which, after firing or curing, has a high temperature coefficient of resistance. Conventional materials for making thermistors are well known to the art and need not be described in detail. Among such conventional materials are the "triple-oxide" compositions. An example of such a composition is the following:

| | Percent (by weight of metals and oxide) |
|---|---|
| Manganese oxide, $Mn_3O_4$ | 56.0 |
| Nickel oxide, NiO | 14.0 |
| Cobalt oxide, $Co_2O_3$ | 30.0 |
| | 100.0 |

Other proportions and other metal oxides may be used as will be obvious to those skilled in the art. Also, compounds which yield the oxides upon firing may be used in place of the oxides themselves, if desired. Such compounds are intended to be included when reference is made herein to "metal oxides."

The metal oxide composition is ground to a degree of fineness such that the particles have cross-sectional dimensions below one micron. Preferably, the starting material is finely-divided to begin with, having, for example, a cross-sectional dimension of 1.1 to 1.4 micron. Starting materials which are already finely-divided are preferred because they reduce the amount of milling that must be done to produce material of less than one micron particle diameter. Also, it is frequently desirable to use metal oxide materials ground to two different particle sizes, as will later appear. When two particle sizes are employed, one is smaller than one micron, and the other is between about 1.0 and 1.5 microns. Where the material as supplied is already in the latter size range, no milling at all is required for the large-size fraction other than such as may be required to ensure thorough mixing of the metal oxides.

Whatever grinding is required, either for mixing or for actual size-reduction, may conveniently be done in a wear-resistant ball mill using balls of alumina.

After the thermistor material has been ground to the required degree it is mixed with water and buffered with ammonium hydroxide to a pH of between about 8 and 10.

The amount of water used to form the dispersion and the associated solids content of the dispersion are not critical except that sufficient water must be used to provide a sprayable consistency. On the other hand, excessive amounts of water are preferably avoided because the water must be evaporated in a subsequent step and the use of excessively dilute dispersions merely increases the amount of water that must be evaporated.

The metal oxide may, if desired, be dispersed in any liquid other than water which is inert toward the oxides and the substrate which will disperse the particles and is sufficiently volatile to be readily evaporated. Water possesses all the requisite characteristics, however, and there is ordinarily no advantage in using any other dispersing medium.

Figure 1:
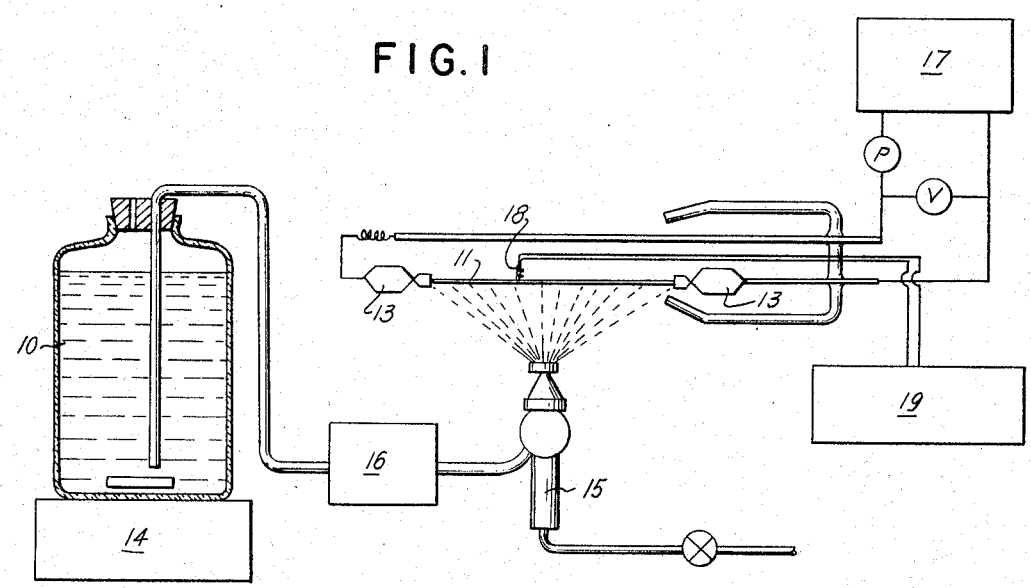
FIGURE 1 is a partially diagrammatic representation of apparatus as used in carrying out the spraying step according to the method of this invention.
Figure 2:
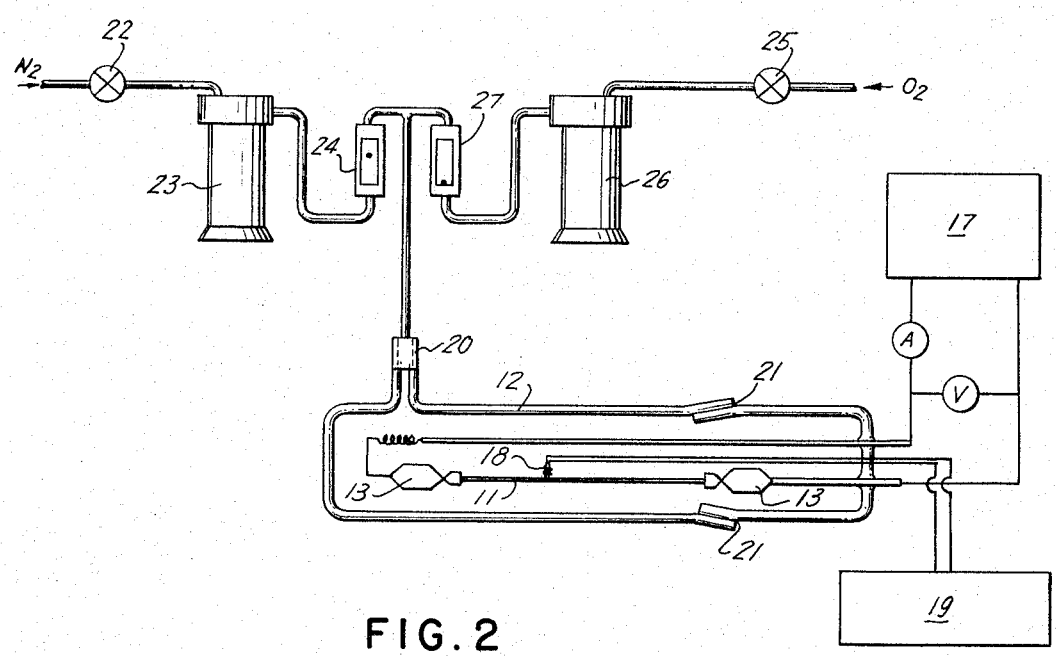
FIGURE 2 is a partially diagrammatic representation of apparatus as used in firing the sprayed film.

Referring now more particularly to FIGURE 1, the liquid dispersion 10 of metal oxides is sprayed onto a suitable substrate 11.

The substrate may be a ceramic, or a metal. Ceramic materials commonly used include alumina, beryllium oxide, magnesium oxide, silica, and boron nitride. Any ceramic or metal may be used which is unreactive with the thermistor oxides and is capable of withstanding the firing temperatures employed.

A typical metallic substrate is nickel.

To secure a good, intimate bond between the metal oxides and the substrate, it is helpful if the substrate have a ceramic type of surface. In all of the ceramic and metallic substrate materials mentioned above, the surface is the ceramic material of the composition as a whole and needs no further preparation.

In the case of metal substrates, such as nickel, it is necessary to provide a ceramic type of surface on the substrate. This may conveniently be done by heating the substrate in air or oxygen to oxidize the surface, either before or after spraying.

Also in the case of metal substrate, it is advantageous to heat the substrate while the metal oxide dispersion is being sprayed on. Heating the substrate hastens evaporation of water from the dispersion and thereby minimizes any tendency for the sprayed-on dispersion to flow laterally over the surface of the substrate and produce irregularities in the thickness of the flake. The degree of heating may vary considerably, but it should be sufficient to volatilize the water (or other suspending liquid) rapidly before any appreciable flow can take place. On the other hand, it should not be excessive, so as to cause the sprayed film to boil or sputter on the surface. As a practical matter, temperatures of about 125° C.±10° C. or such as to dry the sprayed film in from 3 to 5 seconds are preferred.

Ceramic substrates may also be heated during the spraying, if desired. It is preferred, however, to use rather porous ceramic substrates, rather than highly compacted ones. When a porous substrate is used, the liquid of the spray tends to soak into the substrate, which serves the same purpose as heating, i.e. it immobilizes the sprayed-on oxides, thus minimizing lateral flow and the build-up of unequal thicknesses. The use of a porous, rather than a highly-compacted substrate also facilitates the formation of a strong bond between the flake and the substrate.

The dispersion of metal oxides may comprise particles of only one particle size range below 1.0 micron, or it may be a mixture of particles of two distinct size ranges, one being below 1.0 micron and the other between 1.0 and 1.5 microns, preferably in approximately equal amounts by weight. The two particle size mixture exhibits a better packing fraction and minimizes expansion and contraction of the flake during firing. It is therefore particularly useful on ceramic substrates. The two particle size mixture may also be used on metal substrates. However, in view of the greater thermal expansion and contraction of metal substrates, it is possible and frequently preferable to use a dispersion of metal oxides ground to a single particle size range below one micron.

A single layer of sprayed-on dispersion may be applied, or the first layer may be dried and additional layers sprayed on, depending on the flake thickness desired.

After the desired film thickness has been built up, the substrate with the sprayed film is thoroughly dried. In the case of metallic substrates, the drying can readily be accomplished by resistance heating. Ceramic substrates may be dried in an oven or under infra-red lamps. The purpose of the drying step is to provide for the gradual release of all the free moisture in the film and in the substrate, if the substrate is porous, so that the film and substrate are substantially moisture-free when subjected to the higher temperatures of the firing step. The drying may be carried out, for example, at temperatures in the neighborhood of 125° C.

After drying, the dried substrate and film are inserted into a chamber 12 which can be sealed and in which the atmosphere can be controlled. Preferably, an inert gas such as nitrogen is used for the atmosphere. Provision should be made for flowing the inert gas into chamber 12, through inlet 20, at a substantial rate—say, 10 cubic ft./min. or more—to ensure rapid and complete sweep-out.

The flake is cured by heating it to a temperature between about 1000° C. and 1300° C., depending on the particular thermo-resistive material being fired.

The length of firing at the above temperature may vary from about 5 minutes to about one-half hour. The cooling rate is important and depends somewhat upon the material used. The optimum cooling rate is generally in the neighborhood of 50° C./min. or slower. After cooling, the fired assembly is removed from the chamber.

To incorporate the cured thermistor into an electrical circuit, it is necessary to provide it with electrode contacts. The contacts may be of any conductive material which can be applied as a thin, even coating and which is chemically inert to the substrate and to the thermistor material. Silver, gold, platinum and alloys of these and other materials are commonly used. In connection with the thermistors of this invention, platinum bright contacts fired at temperatures between 400 and 800° C. have been very successful.

In order to more fully illustrate the nature of this invention and the manner of practicing the same, the following examples are presented:

*Example 1.—Film sprayed on nickel substrate*

A nickel strip is provided, of dimensions ¼″ x 3″ x 0.001″. Other sizes may be used, but this size strip lends itself readily to resistance heating, and is therefore particularly convenient.

The nickel strip 11 is first cleaned in acetone, then in alcohol, and finally rinsed in distilled water containing a few drops of ammonium hydroxide.

After cleaning, the nickel strip 11 is connected across the terminals 13 which are spring-loaded clamps in order to maintain uniform tension during the subsequent processing.

Material to be sprayed is made up as follows: Ground mixed oxides of manganese, nickel and cobalt, having the composition set forth above and a particle size below one micron are mixed with distilled water and ammonia in the proportion of 10 grams of mixed oxides, 11 ml. of water and 1 ml. of ammonium hydroxide. The ammonium hydroxide serves as a wetting agent. The mixture is agitated for 2 hours by any suitable stirrer such as magnetic agitator 14 until well suspended and free of lumps.

The mixture is then transferred to a spray gun (or air brush) 15, with a wide enough spray to cover the nickel strip without moving the spray or the strip. The transfer may, for example be effected by a pump 16.

Prior to spraying, the nickel strip is further prepared by heating in air to a temperature between 350° C. and 800° C. for approximately 3 minutes. This step oxidizes the surface of the strip.

This heating, the subsequent heating steps, as well as control of the cooling rate, are carried out by electrical resistance heating of the nickel strip 11. Power for the heating is supplied by any suitable power supply 17 having conventional controls (not shown) to control the current passing through nickel strip 11 and thereby the temperature of the strip. The temperature may be followed by means of a thermocouple 18 registering on a potentiometer 19. If desired, other conventional means may be employed for measuring the temperature of the strip, such as a contact thermometer for the low-temperature heating, or an optical pyrometer or the like for the firing. Also, if desired, the potentiometer may be used to control the power supply, in a conventional feed-back loop, to provide automatic temperature control.

The strip is then held in a horizontal position, and the spray gun or air brush 15 is held about 1 foot away, above the strip at approximately a 45° angle. The current through the strip is adjusted to maintain a temperature of 125°±10° C. and the suspension of thermistor oxides is sprayed on the strip. The sprayed material dries in approximately 3 to 5 seconds. The temperature may be adjusted by adjusting the current if the drying is too slow or too rapid.

The strip is then transferred to a closed chamber 12 with provision in the form of gas inlet 20 for passing gas into and through it. Nitrogen is supplied to the gas inlet from an external supply through regulator 22, wash 23, and flow meter 24, at the rate of about 10 cubic ft./min., and the electric current is adjusted so as to heat the strip to 1150° C., and maintained at that temperature for 15 minutes. The current is then gradually reduced so as to cool the strip at a rate of 50° C./min. down to room temperature. The nitrogen atmosphere is maintained until the cooling cycle is complete, either by maintaining a small static pressure of nitrogen, or by cracking the ground-glass joint 21 slightly and allowing nitrogen to flow through the chamber continuously.

The fired strip is then removed from the reaction chamber and suitable masking is applied, to limit the electrode area. Platinum bright electrode material is sprayed on and fired at a temperature of 600° C.

The nickel oxide film and the thermistor oxide material are then removed from a band along one side of the strip, by sandblasting or air abrading. The strip is then cut into sections at right angles to the cleared band. One wire is welded to the exposed portion of the nickel strip, and a second is soldered to the platinum electrode, using a minimum of solder.

The resulting thermistor is compact, stable, sensitive, and possessed of a very short time response.

*Example 2.—Film sprayed on ceramic substrate*

A block of beryllium oxide, BeO, is cleaned in dilute nitric acid, then washed in distilled water, washed in detergent solution and finally rinsed thoroughly in distilled water. The cleaned block is kept wet until used.

Material to be sprayed is made up as follows: Mixed oxides of manganese, nickel and cobalt, in the proportions given above, are ground to two particle sizes. Five grams of material having a particle size between 1.0 micron and 1.5 micron and 5 grams of material having a particle size below 1.0 micron are combined with 100 ml. of distilled water and 1 ml. of ammonium hydroxide. The resulting mixture is agitated for 2 hours or until well suspended and free of lumps.

The suspended mixture is transferred to an air brush. The substrate is placed in a horizontal position and the air brush held above it at an angle of about 45°. The substrate is sprayed until completely wet and dark, after which it is allowed to dray at room temperature. If a further thickness is required, the dried block may be sprayed again. After the final spray and room-temperature drying, the assembly is dried under infra-red or heat lamps for at least 2 hours.

The dried block with its associated film is then fired. The firing may be done in a kiln for 12 to 16 hours at temperatures between 1000 and 1300° C.

If preferred the firing may instead be carried out in a chamber as described in Example 1, heating the block by resting it on a resistance-heated strip.

Two coats of platinum bright are then fired on at temperatures between 400 and 800° C., after which lead wires may be soldered on.

Thermistors according to this invention, whether on metallic or ceramic substrates, may be adjusted as to resistance by air abrading either the thermistor oxide material or the electrode area.

In the above description, particularly in Example 1, the preliminary oxidation of nickel strip 11 has been described as being carried out by heating in air. In some cases, it is advantageous to carry out this oxidation step by heating the strip in an atmosphere of oxygen. In such a case, there is provided an external supply of oxygen arranged to supply oxygen via regulator 25, wash 26 and flow meter 27, to the same gas inlet 20 on chamber 12 as is used for the nitrogen. When this system is used, the original nickel strip 11 is clamped between terminal clamps 13, chamber 12 is assembled and swept out with oxygen, and the nickel strip is resistance-heated while maintaining the oxygen atmosphere. The chamber is then disassembled, the nickel strip is sprayed as above described, and the chamber is reassembled. The chamber is then swept out with nitrogen and the strip and the thermistor coating fired in the same manner as above described.

This invention provides an improved method for the manufacture of flake thermistors. The method is reliable and produces thermistors of extreme thinness and extremely rapid time response. It does not require the handling of fragile flakes of thermistor material, and substantially eliminates any tendency for the flakes to curl or spall away from the substrate during firing. It provides the convenience of the spray technique, while eliminating the disadvantages normally associated with spraying methods.

While this invention has been described with reference to certain preferred embodiments and illustrated by way of certain drawings and examples, these are illustrative only, as many alternatives and equivalents will readily occur to those skilled in the art, without departing from the spirit or proper scope of the invention. The invention is therefore not to be construed as limited, except as set forth in the appended claims.

Having thus fully described the invention, what is claimed as new and desired to be secured by Letters Patent of the United States, is:

1. A method for making an electrical resistance element which comprises in combination the steps of providing a liquid buffered suspension of metal oxide material, at least a substantial proportion of said metal oxide material having a particle size smaller than one micron, said liquid buffered suspension being a suspension in a substantially completely volatile liquid suspending medium, spraying said suspension onto a substrate having a ceramic surface, drying said sprayed-on suspension to form a substantially dry film, and curing said film by heating said film and said substrate to a temperature at least equal to the sintering temperature of said metal oxide material.

2. A method for making an electrical resistance element which comprises in combination the steps of providing a first mixture of metal oxides having a particle size less than 1.0 micron providing a second mixture of metal oxides having a particle size between 1.0 and 1.5 microns, dispersing said first mixture and said second mixture in a volatilizable liquid dispersant buffered with ammonium hydroxide to form a fluid suspension, spraying said suspension onto a substrate having a ceramic surface, drying said sprayed-on suspension to form a substantially dry film, and curing said film by heating said film and said substrate to at least the sintering temperature of said metal oxide material.

3. A method for making an electrical resistance element which comprises in combination the steps of providing a liquid suspension of metal oxide material buffered with ammonium hydroxide to a pH of between about 8 and 10, at least a substantial proportion of said metal oxide material having a particle size smaller than one micron, providing a metallic substrate, oxidizing the surface of said metallic substrate, spraying said suspension onto said substrate, drying said sprayed-on suspension to form a substantially dry film, and curing said film by heating said film and said substrate to at least the sintering temperature of said metal oxide material.

4. The method according to claim 3 in which the metallic substrate is nickel.

5. The method according to claim 1 in which the curing step is carried out in a controlled atmosphere.

6. A method for making an electrical resistance element which comprises in combination the steps of providing a liquid suspension of metal oxide material buffered with ammonium hydroxide to a pH of between about 8 and 10, at least a substantial proportion of said metal oxide material having a particle size smaller than one micron, providing a metallic substrate, spraying said suspension onto said substrate, drying said sprayed-on suspension to form a substantially dry film, and curing said film by heating said film and said substrate to at least the sintering temperature of said metal oxide material.

References Cited

UNITED STATES PATENTS

| | | | |
|---|---|---|---|
| 2,724,658 | 11/1955 | Lytle | 117—104 X |
| 2,775,531 | 12/1956 | Montgomery. | |
| 2,930,718 | 3/1960 | Abbott | 117—47 |
| 3,052,573 | 9/1962 | Dumesnil | 338—308 |
| 3,061,476 | 10/1962 | Miserocchi | 29—155.7 X |
| 3,219,480 | 11/1965 | Girard | 338—22 X |
| 3,234,442 | 2/1966 | Maissel. | |
| 3,261,082 | 7/1966 | Maissel | 29—155.7 |

JOHN F. CAMPBELL, *Primary Examiner.*

J. CLINE, *Assistant Examiner.*